United States Patent Office 3,702,827
Patented Nov. 14, 1972

3,702,827
DISMUTATION OF OLEFINS
Robert P. Arganbright, Houston, Tex., assignor to Petro-Tex Chemical Corporation, Houston, Tex.
No Drawing. Filed July 23, 1969, Ser. No. 844,207
Int. Cl. B01j *11/78*
U.S. Cl. 252—441  5 Claims

ABSTRACT OF THE DISCLOSURE

Using as a catalyst $MoO_3$-$Re_2O_7$ (weight ratio approximately 10:1) on an alumina support it is possible to carry out dismutation reactions of $C_2$–$C_{20}$ acyclic monoolefins at low temperatures and much smaller amounts of $Re_2O_7$ than are conventionally necessary, e.g., prior art required 10 percent $MoO_3$ at 150° C. or 20 percent $Re_2O_7$ at 38°; whereas the present invention requires 10 percent $MoO_3$-1 percent $Re_2O_7$ at 38° C. to give higher conversion and yields. By modifying this catalyst with a small amount of fluoride ion isobutylene which otherwise is subject to oligomerization can be dismutated with $C_3$–$C_{20}$ acyclic monoolefins. The products are different and more desirable olefins than the starting materials.

BACKGROUND OF THE INVENTION

The reaction of olefinic molecules in the presence of metal containing catalysts to produce an equal number of other olefinic molecules, e.g. propylene passed over a molybdenum-alumina catalyst to yield as the principal products ethylene and butenes by the reaction

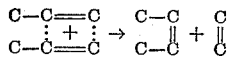

is often referred to as "disproportionation" and can be attributed to Robert L. Banks and Grant C. Bailey, I & EC Product Research and Development, vol. 3, No. 3, September 1964, pp. 170–173. The term "dismutation" has also been employed to describe this reaction and is the term used herein to describe the reaction of olefinic molecules to produce an equal number of other olefinic molecules.

In addition to reaction of a single molecule type as described by Banks and Bailey, there has been considerable interest in a variation of this process wherein two dissimilar olefin molecules are reacted to form two molecules of a different single olefin, e.g. ethylene and 2-butene react to form propylene. This variation is shown in Netherlands patent application 6514985 of British Petroleum Company, Limited, published May 20, 1966.

Dismutation of olefinic materials offers a new vista of synthesis of valuable olefin monomers from less valuable olefin monomers. By the novel combination of the present invention a synergism resulting in low temperature dismutation has been obtained. It was shown in commonly assigned application Ser. No. 819,945 filed Apr. 28, 1967, that the oligomerization of isobutylene could be inhibited and the dismutation of isobutylene and an acyclic olefin having 2 to 20 carbon atoms could be obtained by treating alumina supported oxides of molybdenum, tungsten and rhenium with a soluble fluoride salt. The tungsten and molybdenium oxide catalysts required relatively high temperatures whereas the rhenium oxide catalyst operated at much lower temperatures, but required higher catalyst concentrations. Low temperatures and low rhenium oxide concentration are achieved by the invention described below.

DESCRIPTION OF THE INVENTION

It has now been found that the dismutation of olefins can be carried out at low temperatures over a novel molybdenum oxide-rhenium oxide catalyst. Briefly stated, the present invention is a process for the dismutation of olefins in the presence of a catalytic composition comprising rhenium oxide on molybdenum oxide or mixtures of rhenium oxide and molybdenum oxide on a support comprising a major proportion of alumina. A second aspect of the present invention is the novel catalyst which allows the use of very low temperatures and only a fraction of the rhenium oxide previously employed.

In regard to isobutylene which has a tendency to oligomerize under the conditions and with the catalysts that produce dismutation reactions with other olefins it has now been found that the oligomerization is inhibited and the dismutation of isobutylene and a $C_3$ to $C_{20}$ olefin can be carried out at low temperatures over a molybdenum oxide-rhenium oxide catalyst which has been treated with a fluoride salt. Briefly stated, this aspect of the present invention is a process for the reaction of 2-methyl-1-propene and an olefin comprising contacting 2-methyl-1-propene and an olefin having at least 3 carbon atoms in the presence of a catalytic composition comprising rhenium oxide and molybdenum oxide on a support of a major proportion of alumina said catalytic composition incorporating a modifying amount of fluoride ion.

Another aspect of the present invention is the fluoride catalyst which is a composition comprising rhenium oxide and molybdenum oxide on a support comprising a major proportion of alumina said catalyst incorporating a modifying amount of fluoride ion.

REACTANTS

Suitable olefins for the dismutation reactions are typically acyclic monoolefins having 2 to 20 carbon atoms and include, for example, ethylene, propene, 1-butene, 2-butene, 1-pentene, 2-pentene, 3-hexene, 4-methyl-1-heptene, 2-decene, 6-dodecene, 3-tetradecene, 10-eicosene and the like. A preferred class of olefins has up to 10 carbon atoms and a still more preferred class would have up to 6 carbon atoms. Since there is tendency for isobutylene to oligomerize with the unmodified $MoO_3$-$Re_2O_7$ catalyst, it is not a preferred reactant with that catalyst, however, modification of the $MoO_3$-$Re_2O_7$-alumina catalytic composition as indicated hereinafter with fluoride ion inhibits this tendency to oligomerize. In the dismutation of isobutylene either with itself or other olefins it should be noted that the olefin should have at least 3 carbon atoms. Ethylene will, of course, react with isobutylene; however, the products are the same as the starting materials.

One embodiment of the present invention relates to the preparation of 2-methyl-2-butene from 2-methyl-1-propene and 2-butene in a fluoride modified system. In this embodiment the reaction can be represented as:

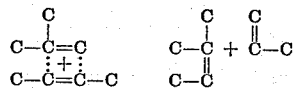

2-methyl-2-butene is of value as the immediate precursor of isoprene which is obtained by the oxydehydrogenation of 2-methyl-2-butene. Isoprene is of value in the preparation of synthetic rubbers. The other product of this reaction is propene which polymerizes alone to polypropylene or with other olefin monomers such as ethylene to produce ethylene-propylene co-polymers which have wide usefulness such as films, fibers and coatings.

In addition to the utilities for 2-methyl-2-butene and propene listed above, the olefinic products of the dismutation reactions described herein for the most part, have established utility as precursors of polymers. The olefinic products are hydrated by conventional means to produce polyhydric alcohols which are employed in the preparation of polyurethanes and polyesters, formed by the condensation, respectively, of polyisocyanates such as toluene diisobyanate and polybasic acids such as terephthalic acid with the polyols so produced.

CATALYSTS

The catalyst employed in the process of the invention comprises a catalyst support, an oxide of molybdenum and an oxide of rhenium. The metal catalyst composition component comprises the oxides in a high positive oxidation state, e.g. hexavalent molybdenum and heptavalent rhenium. Preferably $MoO_3$ is added to support first with $Re_2O_7$ deposited thereon; however, the two can be added at the same time as a mixture. When the catalyst is employed in some other form, pretreatment is customarily employed to convert the molybdenum and rhenium to the form of the oxide. The proportion of molybdenum can be varied, generally from about 2.0 to 30 weight percent, with the more preferable proportion being in the range of 5 to 20 weight percent calculated as the metal oxide on the support. The rhenium oxide is deposited onto the molybdenum oxide in quantities, far smaller than would be necessary for rhenium oxide alone. In order to obtain the benefits of the present invention as little as 0.5 weight percent rhenium oxide can be employed. Because of the unpredictable and enhanced effect of the combination of rhenium oxide on $MoO_3$ it is not necessary to use large quantities of rhenium oxide. Generally, no more than 1.5 weight percent rhenium oxide is necessary to obtain optimum results although larger quantities up to 10 weight percent can be employed. The weight ratio of rhenium oxide to molybdenum oxide can vary widely but is generally in the range of 1:60 to 5:1. In the past, great care had to be taken in handling the rhenium oxide since it sublimes at around 450° C. It is quite common to lose a good portion of the rhenium oxide catalyst when it is employed at its conventional concentration of around 20 percent. It has been found there is little if any rhenium oxide lost when the small amounts employed in combination with molybdenum oxide are used.

Suitable supports are high surface area inert materials. Particularly suitable supports comprise at least a major proportion of alumina with no more than minor proportions of other components, specifically a suitable catalyst support contains at least 75 weight percent alumina, preferably 95 weight percent alumina with the remainder being made of essentially inert materials, such as silica or magnesia which do not substantially promote undesirable side reactions.

In the reactions of isobutylene a feature of the invention process is the incorporation of fluoride ion into the alumina supported, oxide of molybdenum-rhenium oxide catalyst. The fluoride ion is incorporated in a reduced amount from that formerly needed. In order to modify the previous catalysts, i.e. molybdenum oxide, tungsten oxide or rhenium oxide on alumina, fluoride ion was incorporated into the catalyst in a weight ratio of F- to metal oxide in the range of .065:1 to 0.20:1. The present catalyst, however, will not tolerate this amount of fluoride and is deactivated. By the term "modifying amount" is meant an ammount sufficient to inhibit oligomerization but not sufficient to deactivate the dismutation capacity of the catalyst. When based on the total metal oxide present, i.e., molybdenum oxide and rhenium oxide this is approximately one-tenth of the fluoride ion previously needed; or, stated otherwise, a weight ratio of fluoride ion to metal oxide present in the range of about 0.0065:1 to 0.020:1. Although no mechanism is proposed to limit the present invention, it would appear that the fluoride ion is a poison to the catalyst. Thus, the maximum amount of fluoride ion specified should not be exceeded, for to do so will totally deactivate the catalyst. The lower limit of fluoride ion concentration indicates the approximate point where oligomerization of isobutylene is inhibited sufficiently to allow more than a trace of the dismutation products. In any event it is essential that the concentration of fluoride ion be in about the range specified in order to obtain the beneficial results of the process.

The fluoride ion is usually present on the catalyst compositions in the form of a soluble salt thereof. Some suitable salts are sodium fluoride, cadmium fluoride, zinc fluoride, potassium fluoride, and the like.

The preparation of the supported catalyst compositions is effected by conventional techniques of dry-mixing, co-precipitation, impregnation, ion exchange and the like. The catalyst compositions components are introduced in separate stages. Although it is not critical, it is preferred to add the fluoride salt, if any, subsequently to the other catalyst components. It is the usual practice to pretreat or activate the catalyst composition prior to uilization in the process. The precise method of pretreatment employed will depend to some extent on the nature and form of the catalyst components. In general, however, the pretreatment comprises heating an initially prepared supported catalyst in an atmosphere of non-reducing gas such as nitrogen, argon, carbon monoxide or oxygen containing gas. One function served by the pretreatment is to convert the catalyst into the form of the oxides if these components were not initially provided as oxides. For example, initial catalyst components such as ammonium molybdate, ammonium perrhenate and the like are converted to corresponding oxides by heating in a non-reducing atmosphere.

It is desirable that at least a major proportion of the catalyst components initially be present in the highest oxidation state possible and, if not, the desired elevation of positive oxidation is effected by pretreatment in the presence of oxygen, alone or in mixtures with other gases. Regardless of the initial form of the catalyst components, the formed catalyst should be maintained at elevated temperatures for a time. The pretreatment temperature is not critical and is typically in the range of 300–750° C. Pretreatment times typically range from 1 to 12 hours. Subsequent to pretreatment, the supported catalyst composition is usually flushed with inert gas to remove residual traces of oxygen or adsorbed water and returned to room or reaction temperature in an oxygen free atmosphere. The finished catalyst is employed in any conventional form such as powder, flakes, spheres, pellets, or the like.

A typical procedure of preparing the catalyst would be to add the molybdenum component, as ammonium molybdate, for example, to the alumina support and to calcine the impregnated alumina at 550° C. in air for two hours, cool the catalyst and then to add the rhenium oxide and to heat the rhenium oxide impregnated molybdenum oxide-aluminum at 550° C. in air for about two hours. The catalyst is now cooled to reaction temperature or room temperature and flushed with nitrogen. If the reaction feed includes isobutylene the catalyst is treated with sodium fluoride and pretreated in air at 550° C. for one hour prior to nitrogen purging.

REACTION CONDITIONS

The reaction is conducted by contacting the olefin feed with the supported, modified or unmodified catalyst at a dismutation temperature generally in the range of room temperature, about 20° C., to about 80° C., preferably 25–50° C. Some reaction can be obtained at lower temperatures and temperatures up to 150 or more can be employed. Previously it had been known that rhenium oxide would operate in the temperature ranges specified herein; however, relatively large quantities of rhenium oxide were needed to obtain satisfactory results at such low temperature, i.e., generally around 20 weight percent. At 1 weight percent of rhenium oxide on alumina no activity in regard to monoolefins was observed even at temperatures up to 150° C. Although molybdenum oxide supported on alumina required lower concentrations of molybdenum oxide than the rhenium catalyst, i.e. 10 weight percent, higher temperatures, 75-150° C., were required to activate the catalyst. Yet, by some unexplained mechanism, the catalyst compositions of the present invention employ only a fraction of the rhenium oxide previously employed in cooperation with molybdenum oxide at its conventional concentration to operate in the process of the present invention at temperatures suitable for rhenium oxide but too low to effectively employ molybdenum oxide. In regard to isobutylene, the fluoride modified catalysts have exhibited analogous behaviour to the unmodified catalyst in relation to catalyst type, concentration and reaction temperature. The process is typically carried out at from atmospheric to superatmospheric pressures. Suitable pressures are in the range of 1-150 atmospheres, preferably up to 70 atmospheres.

The reaction is conveniently carried out as a continuous process in a tubular reactor wherein the catalyst is maintained in a fixed or fluidized bed. Alternatively, a batch type operation can be employed by agitating the olefin reactants and catalyst together in a suitable reactor such as an autoclave. In the continuous process a convenient method of measuring olefin addition is in terms of weight hourly space velocity (WHSV) which measures the weight of olefin which contacts unit weight of catalyst composition per hour and is in units of reciprocal hours (hr.$^{-1}$). It is convenient in the instant process to continuously add the olefin feed to the reactor at constant pressure, for example, to 1500 p.s.i., at a WHSV typically in the range of .01 hr.$^{-1}$ to 0.10 hr.$^{-1}$. In the case of a mixed olefin feed the components are all added continuous at constant pressure.

The reaction products can be recovered by conventional means, such as fractional condensation, fractional distillation or the like.

The following examples are present to further illustrate the invention:

EXAMPLE 1

Preparation of MoO$_3$-alumina catalyst

A MoO$_3$-alumina catalyst was prepared by impregnating dry commercial alumina ⅛″ pellets (Alcoa H-151) with sufficient ammonium molybdate hydrate (in solution) to provide 10 weight percent of molybdenum oxide (MoO$_3$) on the support. The impregnated alumina was heated to 550° C. for about 2 hours under a flow of air. The catalyst was then cooled to room temperature and placed under nitrogen.

EXAMPLE 2

Preparation of Re$_2$O$_7$-alumina catalyst

A rhenium oxide catalyst was prepared by impregnating dry commercial ⅛″ alumina pellets with sufficient amomnium perrhenate (in solution) to provide 20 weight percent rhenium oxide (Re$_2$O$_7$) on the support. The impregnated alumina was heated for about 2-3 hours at 550° C. The catalyst was cooled to room temperature and placed under nitrogen. Similarly, a catalyst containing 1 weight percent rhenium oxide was prepared.

EXAMPLE 3

Preparation of MoO$_3$-Re$_2$O$_7$-alumina catalyst

Portions of the MoO$_3$-alumina catalyst prepared as in Example 1 were impregnated with sufficient rhenium oxide (in solution) to provide respectively 0.5 weight percent, 1 weight percent, and 1.5 weight percent rhenium oxide on the support. The Re$_2$O$_7$ impregnated MoO$_3$-alumina was heated for about 2 hours at 550° C. The catalysts were cooled to room temperature and placed under nitrogen.

EXAMPLE 4

Preparation of halide modified catalyst

Halide modified catalysts were prepared by impregnating the catalyst indicated in the Table I below with the solution indicated. After about one hour the catalyst was dried at 110° C. The modified catalyst was then placed in a tubular reactor and heated at 550° C. for one hour.

TABLE I

| Run | Catalyst | Wt. percent metal oxide on support | | Halide salt | Conc. of halide salt,[1] wt. percent | Wt. ratio halide ion: meta oxide |
|---|---|---|---|---|---|---|
| | | MoO$_3$ | Re$_2$O$_7$ | | | |
| A | MoO$_3$ | 10 | | NaF | 4 | .18 |
| B | MoO$_3$ | 10 | | KF | 4 | .13 |
| C | MoO$_3$—Re$_2$O$_7$ | 10 | 1.0 | NaF | .2 | .008 |
| D | Re$_2$O$_7$ | | 20 | NaF | 4 | .086 |

[1] Aqueous.

EXAMPLES 5-13

These examples present a series of runs using as the feed propene over the unmodified catalysts previously described. These runs were made in vertical, glass, tubular reactors with fixed catalyst beds. The reactor effluent was analyzed by gas-liquid phase chromatography (GLPC) to determine weight percent propene converted and the selectivity of the conversion to 2-butene. The reaction conditions and yields are set out in Table II.

EXAMPLES 14-20

Dismutation of isobutylene and 2-butene

These examples present a series of runs using as the feed isobutylene and 2-butene over the catalysts previously described. The reactions were carried out in vertical glass tubular reactors through a fixed bed of catalyst. The reactor effluent was analyzed by GLPC to determine the weight percent isobutylene converted and the weight percent of 2-methyl-2-butene in the product based on isobutylene. The reaction conditions and yields are set out in Table III.

TABLE II

| Example | Catalyst Type | Wt. percent MoO$_3$ | Wt. percent Re$_2$O$_7$ | WHSV, hr.$^{-1}$ | Reaction temp., °C. | Pressure, p.s.i. | Conversion of propene [a] | 2-butene selectivity [b] |
|---|---|---|---|---|---|---|---|---|
| 5 | MoO$_3$ | 10 | | .045 | 25 | 14.7 | 0 | |
| 6 | MoO$_3$ | 10 | | .045 | 150 | 14.7 | 40 | 90 |
| 7 | MoO$_3$ | 8 | | .045 | 120 | 14.7 | 5 | 100 |
| 8 | MoO$_3$—Re$_2$O$_7$ | 8 | 0.8 | .045 | 100 | 14.7 | 42 | 99 |
| 9 | MoO$_3$—Re$_2$O$_7$ | 10 | 1. | .045 | 38 | 14.7 | 46 | 100 |
| 10 | MoO$_3$—Re$_2$O$_7$ | 10 | 1.5 | .045 | 27 | 14.7 | 43 | 99 |
| 11 | MoO$_3$—Re$_2$O$_7$ | 10 | 0.5 | .045 | 35 | 14.7 | 7 | 88 |
| 12 | Re$_2$O$_7$ | | 1. | .045 | 25-65 | 14.7 | 0 | |
| 13 | Re$_2$O$_7$ | | 20 | .09 | 25 | 14.7 | 23 | 99 |

[a] GLPC, based on weight propene in feed.
[b] GLPC, based on propene conversion.

TABLE III

| Example | Catalyst Type | Wt. percent MoO₃ | Wt. percent Re₂O₇ | Wt. ratio, F:metal oxide | WHSV, hr.⁻¹ | Reaction temp., °C | Pressure, p.s.i. | Conversion of isobutylene, percent [a] | 2-methyl-2-butene selectivity, percent [b] |
|---|---|---|---|---|---|---|---|---|---|
| 14 | MoO₃ | 10 | | 0 | 0.1 | 95 | 14.7 | 90 | 0 |
| 15 | MoO₃, NaF | 10 | | .175 | .1 | 150 | 14.7 | 30 | 15 |
| 16 | MoO₃, KF | 10 | | .13 | .1 | 95 | 14.7 | 51 | 20 |
| 17 | Re₂O₇ | | 20 | 0 | .25 | 32 | 14.7 | 5 | 1 |
| 18 | Re₂O₇ | | 1 | 0 | .1 | 32–150 | 14.7 | 0 | 0 |
| 19 | Re₂O₇, NaF | | 20 | .086 | .07 | 38 | 14.7 | 24 | 58 |
| 20 | MoO₃–Re₂O₇, NaF | 10 | 1 | .008 | .1 | 38 | 14.7 | 77 | 15 |

[a] GLPC, based on weight of isobutylene in feed.
[b] GLPC, based on isobutylene conversion.

EXAMPLE 21

This example shows the preparation and use of a catalyst which is a mixture of rhenium oxide and molybdenum oxide on a support. Six grams of ammonium molybdate and 0.55 gram of ammonium perrhenate (in 35 ml. H₂O) were deposited on 43 grams of H–151 Alcoa alumina. The catalyst was generated by heating at 550° C. under air for 1 hour and cooling at 25° C. under nitrogen. Propylene was fed at the rate of WHSV .045 h.⁻¹. At 25° C. there was a trace of activity. At 60° C. the conversion was 18 percent to 2-butene and ethylene.

The invention claimed is:

1. A catalyst composition for use in the dismutation of olefins consisting essentially of .5 to 1.5 weight percent rhenium oxide and 2.0 to 30 weight percent molybdenum oxide on a support comprising at least 75 weight percent alumina.

2. The catalyst composition according to claim 1 wherein the support is at least 95 percent alumina.

3. The catalyst composition according to claim 1 wherein there is 5 to 20 weight percent molybdenum oxide.

4. The catalyst composition for use in the dismutation of isobutylene according to claim 1 wherein said catalyst incorporates fluoride ion, in the form of a soluble salt, in a ratio of fluoride to molybdenum oxide and rhenium oxide of about 0.00065:1 to 0.020:1.

5. The catalyst composition according to claim 4 wherein there is 5 to 20 weight percent molybdenum oxide.

References Cited

UNITED STATES PATENTS

3,424,811  1/1969  Mango _____ 260—680

FOREIGN PATENTS

1,117,968  6/1968  England _____ 260—683 D
1,106,016  3/1968  England _____ 260—683
6608427  12/1967  Netherlands _____ 260—683

PATRICK P. GARVIN, Primary Examiner

P. M. FRENCH, Assistant Examiner

U.S. Cl. X.R.

260—683 D; 252—465, 442

PO-1050
(5/69)

UNITED STATES PATENT OFFICE
CERTIFICATE OF CORRECTION

Patent No. 3,702,827    Dated November 14, 1972

Inventor(s) Robert P. Arganbright

It is certified that error appears in the above-identified patent and that said Letters Patent are hereby corrected as shown below:

Column 1, line 57, reads "April 28, 1967" but should read "April 28, 1969".
Column 3, line 3, reads "diisobyanate" but should read "diisocyanate".
Column 3, line 62, reads "ammount" but should read "amount".
Column 4, line 16, reads "uilization" but should read "utilization".
Column 4, line 53, reads "oxide-aluminum" but should read "oxide-alumina".
Column 6, line 6, reads "amomnium" but should ead "ammonium".
Column 6, Table I, line 35, reads "meta" but should read "metal".

Signed and sealed this 22nd day of May 1973.

(SEAL)
Attest:

EDWARD M. FLETCHER, JR.        ROBERT GOTTSCHALK
Attesting Officer              Commissioner of Patents